United States Patent [19]

McKee

[11] Patent Number: 4,867,216
[45] Date of Patent: Sep. 19, 1989

[54] SUN AND SNOW VEHICLE COVER

[76] Inventor: John P. McKee, 8520-D S. Estes St., Littleton, Colo. 80123

[21] Appl. No.: 292,390

[22] Filed: Dec. 30, 1988

[51] Int. Cl.⁴ .......................................... B60J 11/00
[52] U.S. Cl. .................................................. 150/166
[58] Field of Search ........................ 150/166, 167, 168

[56] References Cited

U.S. PATENT DOCUMENTS

| | | | |
|---|---|---|---|
| 1,410,605 | 3/1922 | Schacht | 150/166 X |
| 2,248,655 | 7/1941 | Bila | 150/166 |
| 2,599,066 | 12/1950 | Osborn | 160/368 |
| 2,716,433 | 8/1955 | Rawlings | 150/166 |
| 2,718,912 | 9/1955 | Zimmerman | 150/166 |
| 3,021,894 | 4/1959 | LaDue | 160/23 |
| 3,316,012 | 11/1965 | Thier | 296/136 |
| 4,049,036 | 9/1977 | Gebhardt | 150/52 X |
| 4,209,197 | 6/1980 | Fischer | 296/216 |
| 4,355,839 | 10/1982 | Rosen | 150/166 |
| 4,635,993 | 1/1987 | Hooper | 296/95 C |
| 4,810,015 | 3/1989 | McNeil | 150/166 X |

FOREIGN PATENT DOCUMENTS

| | | | |
|---|---|---|---|
| 674216 | 11/1963 | Canada | 150/168 |
| 513435 | 10/1939 | United Kingdom | 150/166 |
| 928869 | 6/1963 | United Kingdom | 150/166 |
| 2167719 | 6/1985 | United Kingdom | 150/166 |

Primary Examiner—William Price
Attorney, Agent, or Firm—Brian D. Smith

[57] ABSTRACT

A cover for covering a selected exterior portion of a vehicle is disclosed. The cover includes at least one layer of flexible material having a relatively even surface with a plurality of raised portions projecting outwardly from the surface. The raised portions are sized and spaced from each other to prevent the layer of flexible material from collapsing between the raised portions. The raised portions are also sized and spaced to prevent non-pooled liquid water lying on the surface of the vehicle from making contact with the even surface of the cover. As such, non-pooled water lying on the vehicle's surface is incapable of sticking to the even surface when it freezes. Accordingly, the only portions of the cover capable of freezing and sticking to the vehicle's surface are the raised portions. Thus, the cover is easy to pull off the car even when its raised portions are frozen to the car.

23 Claims, 2 Drawing Sheets

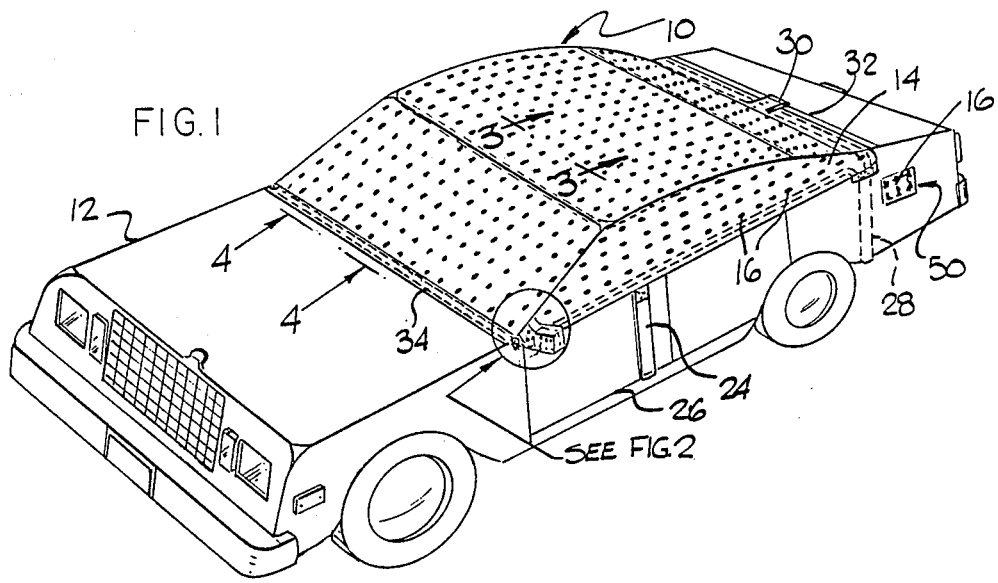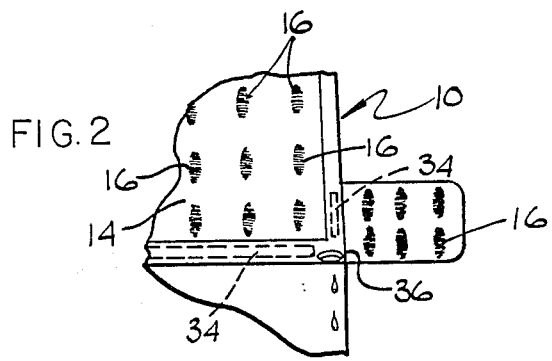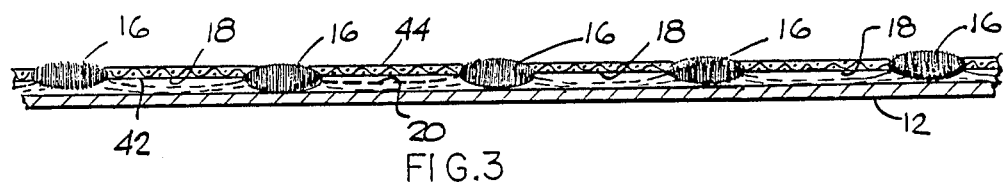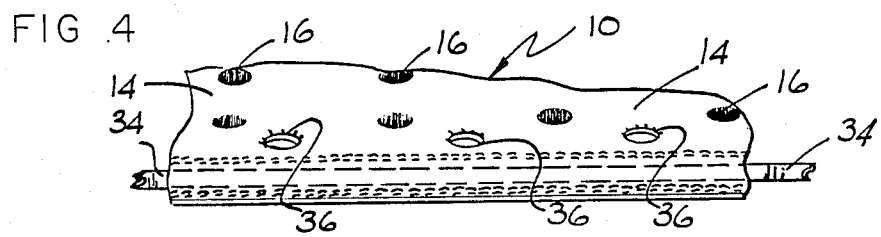

SUN AND SNOW VEHICLE COVER

TECHNICAL FIELD OF THE INVENTION

Invention relates generally to vehicle covers and, more particularly, to vehicle covers for use throughout the year.

BACKGROUND OF THE INVENTION

A number of vehicle covers have been developed in recent years for various purposes Most of these covers are designed to simply protect a vehicle's exterior, i.e. painted surfaces, vinyl roof etc. from the elements.

A few covers, however, have been designed to not only protect a vehicle's exterior but to also reduce the buildup of heat in the vehicles interior. High heat is not only, quite obviously, uncomfortable for people just getting into the vehicle on a hot day but it can also cause damage to the vehicle's interior, particularly the vinyl covered surfaces of the vehicle such as the dashboard. Heat can also cause damage to items left in the vehicle such as magnetic tape recordings.

A few vehicle covers have also been specifically developed for use during the winter. These covers ostensibly make it easy to remove snow and ice covering a vehicle. The snow and ice is removed by simply removing or pulling the cover off the vehicle. In actuality, however, the removal of such a cover is often not easy since the cover often freezes to the vehicle's surface when ambient temperatures drop below freezing. Such freezing is apparently caused by the buildup of condensation on the vehicle's surface under the cover. When freezing conditions occur, the condensation freezes causing the cover to freeze to the vehicle's surface. Such freezing can also occur if the vehicle is wet when the cover is placed on the U.S. Pat. No. 4,049,036 to Gebhardt discloses a cover which is claimed to solve the aforementioned freezing problem. Gebhardt's cover includes a pair of sheets in opposed relationship which are adjoined at their ends to form a pocket. Resilient means are disposed in the pocket to provide a plurality of interstices. The interstices serve as insulating air pockets to prevent the inner surface of the cover from sticking to the adjacent window. The resilient means preferably includes a plurality of coil springs which prevent damage to the sheets when pulling the cover off the vehicle since the springs bear the load of accumulated snow and ice instead of the sheets.

U.S. Pat. No. 4,209,197 to Fischer discloses a vehicle cover for use during the winter and summer. Fischer's cover includes at least two protector parts which are detachably connectable to the vehicle. Each part is designed to extend at least over the vehicle windowpanes and overlap each other in the middle region of the vehicle extending along the vehicle's longitudinal axis. Fischer's cover can also include spacer ribs of resilient material which are located on the inside surface of the cover to space the cover from the surface of the vehicle. The space serves to enhance drying of the cover. Fischer also discloses that drying can be further enhanced by incorporating a plurality of covered ventilating apertures in the cover.

In addition, Fischer states that the cover will not freeze or stick to a vehicle's surface if it is made from a water repellant material. Fischer, however, does not disclose any specific water repellant materials which are capable of preventing ice from sticking to it. The inventor of the present invention does not believe that any such materials exist, at least not any which are both flexible and strong enough to not rip or tear when being pulled off a car covered with snow.

U.S. Pat. No. 4,635,993 to Hooper discloses a multilayered car cover having an outer layer which is resistant to sunlight and a soft inner layer for preventing the cover from sticking to or scratching a vehicle's windshield. Hooper also discloses that an additional layer of insulating material can be inserted between the inner and outer cover to improve the insulating properties of the cover. While this cover is designed to be used year round, it does not appear that Hooper considered the problem of a cover freezing to the windshield. Other patents disclosing covers for windshields or for vehicles include U.S. Pat. Nos. 2,599,066 to Osborn, 3,021,894 to G. F. LaDue and 3,316,012 to Thier.

Despite some of the claims made in the aforementioned patents, a need still exists for a vehicle cover which is easy to pull off a vehicle's surface even if it is frozen to the vehicle's surface. Such a cover should also preferably be usable during the summer months to reflect light away from the car, thereby keeping the car's interior as cool as possible. Such a cover should also preferably be relatively simple in design so that the cover is easily manufactured and thereby relatively inexpensive.

DISCLOSURE OF THE INVENTION

The present invention addresses the aforementioned needs by providing a cover for covering a selected exterior portion of a vehicle, preferably a vehicle's roof, windshield, side windows and rear window. The cover includes at least one layer of flexible material, such as nylon, having a relatively even surface with a plurality of raised portions projecting outwardly from the even surface. The raised portions are sized and spaced from each other to prevent the layer of flexible material from collapsing between the raised portions. The raised portions are also sized and spaced to prevent non-pooled liquid water lying on the surface of the selected exterior portion of the vehicle from making substantial contact with the even surface of the layer of flexible material i.e. when the cover is covering the selected portion of the vehicle with the raised portions in contact with the vehicle's surface. As such, the non-pooled water is incapable of sticking to the even surface when it freezes. Accordingly, the only portions of the cover capable of freezing and thereby sticking to the car's surface are the raised portions since the raised portions are the only portions of the cover actually in contact with the non-pooled water lying on the surface of the vehicle. The effect of this is to make it easy to pull the cover off the car even when the cover is frozen to the car, again since the only portions of the cover actually frozen to the car are the raised portions. The reasoning behind this is based on the fact that it is easier to break apart two opposing surfaces which are held together by only a plurality of frozen point-like contacts than it is to break apart two opposing surfaces which are held together by solid sheet of ice i.e. a sheet of ice making full surface contact with both opposing surfaces.

The cover of the present invention also includes means for securing the cover to the vehicle. Such securing means preferably includes a pair of straps extending from opposite sides of the cover to secure the cover to opposite sides of the vehicle. The securing means also preferably includes magnetic means. The magnetic means is preferably located on the cover so as to overlie a metal surface of the vehicle i.e. when the cover is covering the selected exterior portion of the vehicle.

In another embodiment of the present invention, the vehicle cover is reversible with one side being sunlight reflective and the other side sunlight absorbing. The sunlight reflective side keeps the vehicle's interior cooler when the reversible cover is covering the vehicle with the sunlight reflective side facing upwardly to receive and thereby reflect the direct rays of the sun. The sunlight absorbing side of the cover, on the other hand, heats the vehicle's interior when it is facing upwardly, thereby receiving and absorbing the direct rays of the sun. The sunlight reflective side is provided with the aforementioned even surface having the plurality of raised portions. as previously mentioned, the raised portions are sized and space from each other to prevent the cover from collapsing between the raised portions. The raised portions are also, as previously mentioned, sized and spaced to prevent non-pooled liquid water lying on the surface of the vehicle from making substantial contact with the even surface. Accordingly, this embodiment of the present invention is also capable of being easily removed from a car's surface even when it is actually frozen to the car's surface.

BRIEF DESCRIPTIONS OF THE DRAWINGS

The invention will be more readily understood by reference to the accompanying drawings wherein like reference numerals indicate like elements throughout the drawing figures and in which:

FIG. 1 is a prospective view illustrating a vehicle cover of the present invention for covering a vehicle's roof, windshield, side windows, rear window, side view mirrors and door locks.

FIG. 2 is a partial side view of the vehicle cover illustrated in FIG. 1 as viewed in the direction of the arrow illustrated in FIG. 1.

FIG. 3 is a partial cross-sectional view of the vehicle cover and the vehicle's roof taken along the lines of 3—3 of FIG. 1.

FIG. 4 is a side view of the vehicle cover of FIG. 1 as viewed in the direction of the arrows 4—4 of FIG. 1.

DETAILED DESCRIPTION OF THE PREFERRED EMBODIMENT

Figure 5:
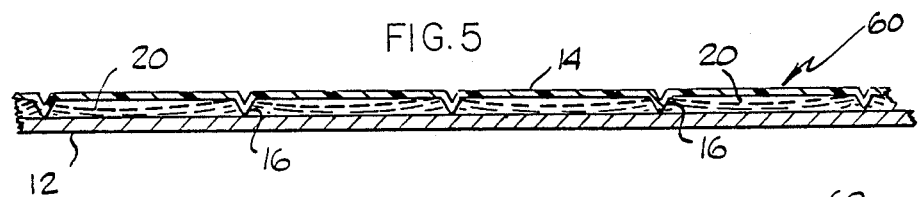
FIG. 5 is a partial cross-sectional view similar to FIG. 3 showing the cross-section of a second embodiment of a vehicle cover of the present invention covering a vehicle's roof.

FIGS. 1 through 4 including 3a illustrate a vehicle cover 10 of the present invention for covering a selected exterior portion of a vehicle or car 12. The selected exterior portion in this embodiment of the present invention includes the car's roof, windshield, side windows, rear window, outside mirrors and door handles.

Cover 10 generally includes a layer 14 of flexible material, preferably nylon, and a plurality of raised portions 16 which project outwardly from a relatively even surface 18 of layer 14.

Each raised portion 16 is made from (or comprises) a plurality of closely packed stitches (not numbered) extending through layer 14 in a zig-zag pattern. The stitches are preferably made from heavy nylon thread and are also preferably sprayed with a waterproofing material (not shown) such as Scotchgard. Scotchgard is a registered trademark of the 3M Corporation of Minneapolis, Minn.

Raised portions 16 are, in accordance with the present invention, sized, shaped and spaced from each other to prevent layer 14 from collapsing between the raised portions, even when the cover is covered with snow. Raised portions 16 are also sized, shaped and spaced from each other to prevent non-pooled water lying on the vehicle's surface from making substantial contact with even surface 18 of layer 14. Moreover, raised portions 16 are also preferably shaped and arranged on layer 14 so as to not impede the drainage of water from the vehicle's surface. This is preferably accomplished by providing the raised portions with a shape that makes more point-like contact with the vehicle's surface as opposed to line contact. Point-like contact is preferred because it allows water to drain between the raised portions. Such point like contact is provided in accordance with the present invention by providing the raised portions with a dome-shape or frustoconical-shape, as illustrated. An example of a raised portion that might impede water drainage and allow water to pool on the vehicle's surface would be a longitudinally extending raised portion such as a rib. Accordingly, with the point-like raised portions of the present invention which allow water drainage, the only water that cover 10 is likely to encounter on the surface of a vehicle is non-pooled water.

Non-pooled water, as defined herein, can exist in several forms. One form could be beaded water. This refers to water which has separated into beads which is what often happens to water lying on a highly waxed surface. Another form of non-pooled water would include a thin layer of water which is prevented from running off a vehicle's surface by molecular attraction of the water's molecules to the vehicle's surface. Non-pooled water might also exist in the form of condensation on a vehicle's surface.

Whatever form the non-pooled water is in, the raised portions of the present invention must have a size, more specifically a height (i.e., height H) above surface 18, which prevents such non-pooled water from making substantial contact with surface 18. As such, non-pooled water will be unable to stick to surface 18 when it freezes. Thus, raised portions 16 will be the only portions of cover 10 actually capable of sticking to the car's surface since they will be the only portions of the cover actually capable of coming into contact with non-pooled water lying on the surface of the vehicle. As a result, it will be quite easy to pull the cover off the car even when the raised portions of the cover are frozen to the car's surface. This is because it is relatively easy to break the frozen point-like raised portions, certainly much easier than it would be to try to break a solid sheet of ice frozen to the vehicle's surface and the entire underside surface of the cover.

Figure 3A:
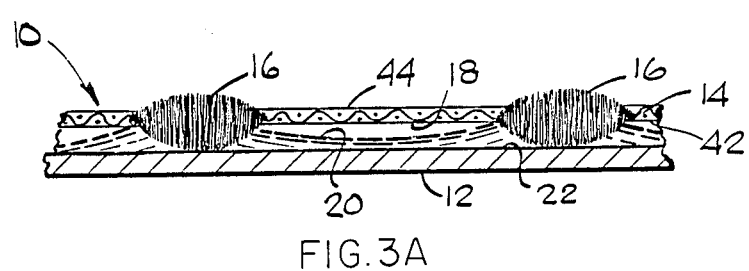
FIG. 3A is an enlarged partial view of FIG. 3.

FIG. 3a best illustrates this aspect of the present invention wherein it can be seen that non-pooled water (identified by numeral 20) lying on a surface 22 of vehicle 12 is in contact with raised portions 16, but not in contact with surface 18 of cover 10. To prevent such contact, raised portions 16, as previously mentioned, should have a height H (as illustrated in FIG. 3a) which is higher than that capable of being attained by non-pooled water. It is believed that a height H of about 3/16 of an inch should prevent non-pooled water from contacting surface 18. Non-pooled water (even highly bead nonpooled water) rarely has a height greater than 3/16 of an inch.

As previously mentioned, raised portions 16 are also spaced from each other to prevent layer 14 from collapsing between the raised portions. Such is necessary to prevent layer 14 from contacting any nonpooled water lying on the vehicle's surface. If such contact were to occur and surface 18 were to freeze to the vehicle's surface, cover 10 would, as previously mentioned, be very difficult to remove from the vehicle's surface.

In the embodiment of FIGS. 1 through 4, such collapsing can generally be prevented by spacing the raised portions between about 0.5 to 0.75 inches from each other i.e., if layer 14 is made from a nylon such as DuPont's Cordora nylon having a thickness of about 0.047 inches. If layer 14 is made out of a more flexible material, raised portions 16 should be spaced more closely to each other to prevent such collapsing. On the other hand, if layer 14 is made out of a more rigid material (yet still flexible) it should be possible to space the raised portions farther apart without having layer 14 collapse between the raised portions.

It is also worth noting that it is virtually impossible for layer 14 to collapse after the raised portions freeze to the car's surface. This is because the raised portions cannot move towards each other to allow layer 14 to collapse once they are frozen to the vehicle's surface. Accordingly, once frozen, layer 14 should not collapse no matter how much snow falls on cover 10.

Cover 10 also includes means for securing the cover to vehicle 12. In FIG. 1, it can be seen that the securing means includes a strap 24 which is attached, preferably stitched, to an edge of the cover. Strap 24 has a conventional anchoring means or clip (not shown) at its other end (i.e., free end) which is designed to fit in the gap (identified by numeral 26) between the vehicle's door and body when the door is closed. The anchoring means is also designed so that it cannot be removed from the gap except by opening the vehicle's door. While not illustrated, another strap 24 is provided on the other side of the cover to secure the other side of the cover to vehicle 12. Optional rear side straps 28 and a trunk strap 30 (which are illustrated in phantom in FIG. 1) may also be utilized, if desired, to secure cover 10 to vehicle 12. Each side strap 28 has a conventional clip (not shown) at its free end for securing the strap to the bottom edge of the vehicle's body. Rear trunk strap 30 also preferably has a conventional clip (not shown) which secures the strap to the vehicle by fitting into the gap (identified by numeral 32) between the trunk and the vehicle's body in a manner similar to that for securing strap 24 to the vehicle.

The securing means also preferably includes magnetic means attached to the cover. The magnetic means secures the cover to the vehicle by being magnetically attracted to the vehicle's metal surface. In the first illustrated embodiment, the magnetic means is provided, as best illustrated in FIGS. 1, 2 and 4, in the form of a magnetic strip 34 which extends substantially around the entire peripheral edge of the cover. The magnetic strip is attached to the cover's edge by hemming it to the edge of layer 14. This is provided by folding the edge of layer 14 back over the magnetic strip and stitching the end of the edge to an underlying portion of layer 14.

Cover 10 also preferably includes means for draining water out from under the cover when the cover is covering the vehicle. In the first illustrated embodiment, such means is provided in the form of a plurality of drainage ports 36 which extend through layer 14. Ports 36 are located adjacent magnetic strip 34 as illustrated in FIG. 4 and between the ends of two magnetic strips 34 which converge at the corner edges of cover 10 as illustrated in FIG. 2.

While not illustrated, cover 10 is also preferably reversible with its side 42 (which includes even surface 18 having raised portions 16) being sunlight reflective so that it can be used as the exterior side of the cover during the summer months. The other side of cover 10, i.e., side 44 is preferably sunlight absorbing so that it can be used as the exterior side of the cover during the winter months. When used as such, the cover will keep the car's interior cooler during the summer and warmer during the winter. Side 42 can be made sunlight reflective by providing it with a light color. Similarly, side 44 can be made sunlight absorbing by providing it with a dark color.

FIG. 1 also illustrates a second embodiment of the present invention which comprises a cover 50 for covering the gas cap door of vehicle 12. Cover 50 is similar to cover 10 except that it does not include any straps 24, 28 or 30. It does, however, have a magnetic strip such as magnetic strip 34 hemmed to its edge for securing the cover over the gas cap door.

Figure 6:
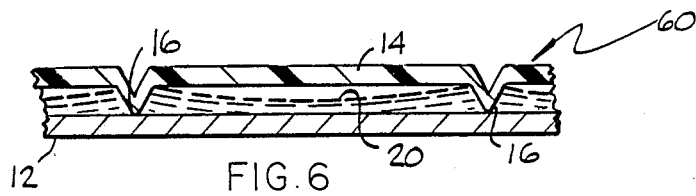
FIG. 6 is an enlarged partial view of FIG. 5.

FIGS. 5 and 6 provide a cross-sectional view of another cover 60 of the present invention for covering a selected exterior portion of a vehicle's surface. Cover 60 is similar to cover 10 except that its raised portions 16 are actually integral with its layer 14. This cover can be formed by heating and passing layer 14 through a pair of rollers wherein one of the rollers is provided with projections having a shape similar to the raised portions. As such, the projections form the raised portions when the layer is passed through the pair of rollers. To make cover 60 in this fashion, layer 14 will have to be made from a material which is capable of being formed by heat and pressure and yet remain flexible after it is formed by such a process. Such a material might include soft flexible plastic materials such as polyethylene.

Figure 7:
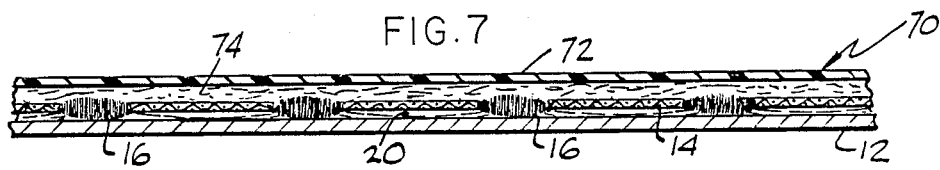
FIG. 7 is a cross-sectional view similar to FIG. 3 showing the cross-section of a third embodiment of a vehicle cover of the present invention lying on the surface of a vehicle's roof.
Figure 8:
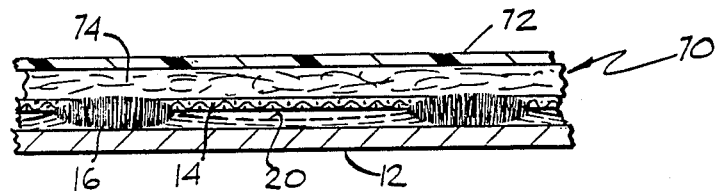
FIG. 8 is an enlarged partial view of the cross-sectional view illustrated in FIG. 7.

FIGS. 7 and 8 provide a cross-sectional view of another cover 70 of the present invention for covering a selected exterior portion of the vehicle's surface. Cover 70 is identical to cover 10 except that it additionally includes an outer layer 72 and an inner insulating layer 74.

Outer layer 72 would preferably be made from a flexible, breathable material such as nylon. It would also preferably be dark colored so that it would be capable of absorbing sunlight during the winter months to keep the car's interior warmer. Accordingly, layer 72 would serve as the exterior side of the cover during the winter. During the summer, layer 14 would preferably serve as the exterior side of the cover. Accordingly, surface 18 (and raised portions 16) should be lightly colored to reflect sunlight and thereby keep the car's interior as cool as possible.

Insulating layer 74 should be made from a flexible insulating material such as cotton. As such, it should be of particular value in keeping the car cool during the summer months since it should significantly enhance the cover's ability to dissipate heat and thereby prevent such heat from reaching the car's interior.

This invention has been described in detail with reference to particular embodiments thereof, but it will be understood that various other modifications can be effective within the spirit and scope of this invention.

What is claimed:

1. A cover for a selected exterior portion of a vehicle, said cover comprising:
   at least one layer of flexible material having a relatively even surface with a plurality of raised portions projecting outwardly from said even surface, said raised portions being sized, shaped and spaced from each other to prevent said layer of flexible material from collapsing between said raised portions and to prevent non-pooled liquid water lying on the selected exterior portion of the vehicle from making substantial contact with said even surface of said layer when said cover is covering the selected portion of the vehicle with said raised portions in contact with the vehicle's surface; and
   means for securing said cover to the vehicle.

2. A cover as claimed in claim 1 wherein said raised portions are substantially dome-shaped.

3. A cover as claimed in claim 2 wherein said dome-shaped raised portions are oblong-shaped when viewed from the top.

4. A cover as claimed in claim 1 wherein said raised portions are substantially frustoconically-shaped.

5. A cover as claimed in claim 1 wherein each raised portion comprises a plurality of stitches extending through said layer of flexible material.

6. A cover as claimed in claim 5 wherein said stitches extend through said layer of flexible material in a zig-zag pattern.

7. A cover as claimed in claim 1 wherein said raised portions are arranged on said layer of flexible material to permit water to drain between the raised portions so that water is prevented from pooling when said cover is covering the selected portion of the vehicle.

8. A cover as claimed in claim 1 wherein said raised portions are integral with said layer of flexible material.

9. A cover as claimed in claim 8 wherein said raised portions are formed from said layer by heating and passing said layer through a pair of rollers wherein one of said rollers is provided with projections having a shape similar to said raised portions so that said projections form said raised portions when said layer is passed through said pair of rollers.

10. A cover as claimed in claim 1 wherein said securing means includes at least one pair of straps wherein said straps of said pair extend from opposite sides of said cover to secure said cover to opposite sides of the vehicle, each strap having anchoring means at its free end for fitting in the gap between the vehicle's door and body and for securing said strap to the vehicle so that said strap cannot be pulled out of the gap and thereby removed from the vehicle except when the door of the vehicle is opened.

11. A cover as claimed in claim 1 wherein said means for securing said cover to the vehicle includes magnetic means attached to said layer of flexible material, said magnetic means being located on said layer so as to over lie a metal surface of the vehicle when said cover is covering the selected portion of the vehicle, said magnetic means thereby being magnetically attracted to the vehicle's metal surface to secure said cover to the vehicle.

12. A cover as claimed in claim 11 wherein said magnetic means includes a magnetic strip extending substantially around the edge of said cover.

13. A cover as claimed in claim 12 wherein said magnetic strip is attached to said cover by being hemmed to said layer of flexible material wherein the edge of said layer is folded back over said magnetic strip and stitched to an underlying portion of said layer.

14. A cover as claimed in claim 1 further comprising means for draining water out from under said cover when said cover is covering the selected exterior portion of the vehicle.

15. A cover as claimed in claim 14 wherein said means for draining includes a plurality of drainage ports extending through said layer of flexible material.

16. A cover as claimed in claim 15 wherein said drainage ports are located along an edge of said cover.

17. A cover as claimed in claim 1 wherein the selected portion of the vehicle includes the vehicle's roof, windshield, side windows, rear window, outside mirrors and door handles.

18. A cover as claimed in claim 1 wherein the selected portion of the vehicle includes the gas cap door.

19. A cover as claimed in claim 1 further comprising a second and third layer of flexible material, said second layer overlying said layer of flexible material having said even surface with raised portions, said third layer overlying said second layer so that said second layer is sandwiched between said layer having said even surface with raised portions and said third layer, said second layer being made from a flexible insulating material, said third layer being made from a flexible breathable material.

20. A cover as claimed in claim 19 wherein said layer of flexible material having said even surface with said raised portions is made from nylon and said third layer is made from nylon.

21. A flexible, reversible cover for a selected exterior portion of a vehicle, said cover comprising:
   a sunlight reflective side and a sunlight absorbing side, said sunlight reflective side keeping the vehicle's interior cooler when said cover is covering the selected portion of the vehicle with said sunlight reflective side facing upwardly to receive and thereby reflect the direct rays of the sun, said sunlight absorbing side heating the vehicle's interior when said cover is covering the selected portion of the vehicle with said sunlight absorbing side facing upwardly to receive and thereby absorb the direct rays of the sun, said sunlight reflective side having a relatively even surface with a plurality of raised portions projecting outwardly from said even surface, said raised portions being sized, shaped and spaced from each other to prevent said cover from collapsing between said raised portions and to prevent non-pooled liquid water lying on the selected exterior portion of the vehicle from making substantial contact with said even surface when said cover is covering the selected exterior portion of the vehicle with said raised portions in contact with the vehicle's surface; and means for securing said cover to the vehicle.

22. A flexible, reversible cover as claimed in claim 21 wherein said sunlight reflecting side is generally light colored and said sunlight absorbing side is generally dark colored.

23. A flexible, reversible cover as claimed in claim 21 wherein said raised portions are substantially dome-shaped.

* * * * *

UNITED STATES PATENT AND TRADEMARK OFFICE
CERTIFICATE OF CORRECTION

PATENT NO.   : 4,867,216

DATED        : September 19, 1989

INVENTOR(S)  : John P. McKee

It is certified that error appears in the above-identified patent and that said Letters Patent is hereby corrected as shown below:

Col. 1, line 11, after "purposes" and before "Most" insert --.--.

Col. 1, line 36, after "the" insert --vehicle--.

Col. 3, line 49, after "5." start a new paragraph.

Col. 5, line 6, change "nonpooled" to --non-pooled".

Col. 5, line 11, change "nonpooled" to --non-pooled--.

Signed and Sealed this

Fourteenth Day of August, 1990

Attest:

HARRY F. MANBECK, JR.

*Attesting Officer*    *Commissioner of Patents and Trademarks*